(12) United States Patent
Amadeo

(10) Patent No.: US 6,628,240 B2
(45) Date of Patent: Sep. 30, 2003

(54) METHOD AND APPARATUS FOR RAPID STAKING OF ANTENNAE IN SMART CARD MANUFACTURE

(75) Inventor: Paul Amadeo, San Diego, CA (US)

(73) Assignee: American Pacific Technology, San Diego, CA (US)

( * ) Notice: Subject to any disclaimer, the term of this patent is extended or adjusted under 35 U.S.C. 154(b) by 101 days.

(21) Appl. No.: 09/976,675

(22) Filed: Oct. 12, 2001

(65) Prior Publication Data

US 2002/0100810 A1 Aug. 1, 2002

Related U.S. Application Data

(60) Provisional application No. 60/247,436, filed on Nov. 8, 2000.

(51) Int. Cl.[7] .................... H01Q 7/00; G06K 19/06
(52) U.S. Cl. .................... 343/866; 343/741; 235/492; 361/737
(58) Field of Search .................... 343/741, 866, 343/895; 29/600; 235/380, 488, 492, 493; 361/737, 760, 761

(56) References Cited

U.S. PATENT DOCUMENTS

| | | | | |
|---|---|---|---|---|
| 5,371,348 A | * | 12/1994 | Kumar et al. | 235/472.02 |
| 5,428,214 A | * | 6/1995 | Hakkers et al. | 235/492 |
| 5,598,032 A | * | 1/1997 | Fidalgo | 257/679 |
| 5,671,525 A | * | 9/1997 | Fidalgo | 29/600 |
| 6,008,993 A | * | 12/1999 | Kreft | 361/737 |
| 6,073,856 A | * | 6/2000 | Takahashi | 235/492 |
| 6,161,761 A | * | 12/2000 | Ghaem et al. | 235/492 |
| 6,378,774 B1 | * | 4/2002 | Emori et al. | 235/492 |
| 6,404,643 B1 | * | 6/2002 | Chung | 361/737 |
| 6,459,588 B1 | * | 10/2002 | Morizumi et al. | 361/737 |

* cited by examiner

Primary Examiner—Tan Ho
(74) Attorney, Agent, or Firm—Fish & Richardson P.C.

(57) ABSTRACT

A system for implanting a wire antenna in a contactless smart card includes an ultrasonic implanting head with a voice-coil actuator to control the pressure at which a heated wire is forced into a plastic card substrate. The force produced by the actuator is proportional to the current in a coil winding in the actuator. A controller uses a feedback system to maintain a relatively constant applied pressure. The feedback system monitors the current in the coil and the controller issues electronic signals to increase or decrease the current in the coil in response to the monitored current.

18 Claims, 6 Drawing Sheets

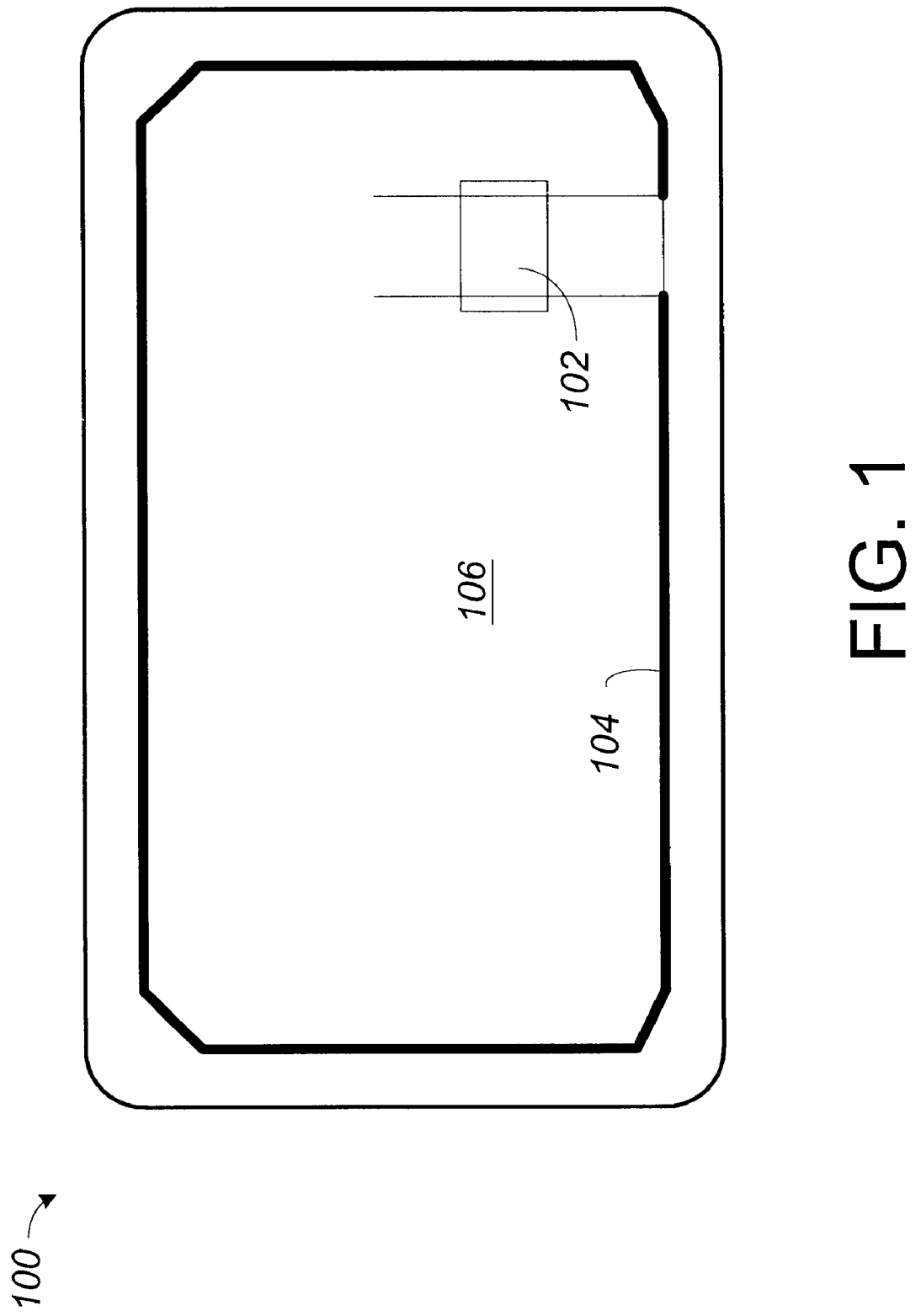

METHOD AND APPARATUS FOR RAPID STAKING OF ANTENNAE IN SMART CARD MANUFACTURE

CROSS-REFERENCE TO RELATED APPLICATIONS

This application claims priority to U.S. Provisional Application Serial No. 60/247,436, filed on Nov. 8, 2000 and entitled "Integration of Highly Accurate Pressure-Sensitive Voice Coils for the Rapid Staking of Round Wire as Antenna for the Manufacture of Contactless Smart Cards."

BACKGROUND

Smart cards are plastic cards that incorporate an integrated circuit (IC) chip with some form of memory. Many smart cards are wallet-sized, as specified by International standard organization (ISO) standards. These international standards specify physical characteristics of cards, transmission protocols, and rules for applications and data elements.

Memory-based smart cards include memory and some non-programmable logic. Such cards may be used as personal identification cards or phone cards. More complex processor-based smart cards may include a central processing unit (CPU) and ROM for storing an operating system, a main memory (RAM), and a memory section for storing application data (usually an EEPROM). Processor-based smart cards may be used where heavy calculations or more security is required.

Smart cards may fall into one of two categories: contact and contactless. Contact cards must be inserted into a card reader to be accessed. Contact cards include an interconnect module, usually gold plated, with contact pads. The interconnect module may include power, reset, ground, serial input/output (SIO), and clock signal contact pads, as laid out in ISO 7816. The contact pads are physically contacted by pins in the reader to power and communicate with the IC chip. Contact cards are commonly used as telephone prepayment cards and bank cards.

Contactless cards do not require contact with the reader to be accessed. Contactless cards include an antenna embedded in the card which may be used for power transmission and communication by radio signals or capacitive inductance. Some advantages of contactless cards over contact cards include faster transactions, ease of use, and less wear and tear on the cards and readers.

The antennas may be embedded in the card by ultrasonically heating a wire and implanting the heated wire into the plastic of the card substrate in a desired antenna pattern. The parameters which determine the success and quality of an implanted antenna are the amount of ultrasonic energy used to heat the wire, and the pressure and speed of implantation. With regard to pressure, if the implanting head applies too much pressure, the writing horn may run into the plastic and plastic may power back up into the tool. However, if too little pressure is applied, the wire may not embed into the plastic at all. Accordingly, it is desirable to precisely control the pressure applied during implantation.

SUMMARY

In an embodiment, a system for implanting a wire antenna in a contactless smart card includes an ultrasonic implanting head with a voice-coil actuator to control the pressure at which a heated wire is forced into a plastic card substrate. The force produced by the actuator is proportional to the current in a coil winding in the actuator.

A controller uses a feedback system to maintain a relatively constant applied pressure. The feedback system monitors the current in the coil and the controller issues electronic signals to increase or decrease the current in the coil in response to the monitored current.

BRIEF DESCRIPTION OF THE DRAWINGS

FIG. 1 is a sectional view of a smart card according to an embodiment.

DETAILED DESCRIPTION

FIG. 1 illustrates a contactless smart card 100 according to an embodiment. The contactless card 100 contains an integrated circuit (IC) chip 102 connected to a wire-wound antenna 104 embedded in a plastic card layer 106. The antenna 104 may include three or four turns of wire and is generally located around the perimeter of the card. The card may conform to International Standard Organization (ISO) 14443 or 15693, an international standard for remote coupling contactless cards. ISO specifies physical, mechanical, and electrical features of the card and the communication protocols between the card and the reader, without restricting the architecture of the IC chip in the card or the application for the card. A popular architecture for such contactless smart cards is the Mifare architecture and related protocols developed by Philips Semiconductor.

Reader peripherals and reader/writer (R/W) units read contactless smart cards through low-wattage radio frequencies, generally between 10 MHz to 15 MHz. The readers produce a low-level magnetic field by means of a transmitting antenna, usually in the form of a coil. The magnetic field serves as a carrier of power from the reader to the contactless smart card, which accesses this field through the embedded antenna 104. The reader recovers the electromagnetic signal from the passive smart card and converts the signal back into an electrical form. Once the reader has checked for errors and validated the data received from the smart card, the data is decoded and restructured for transmission in the format required by the host computer.

Figure 2A:
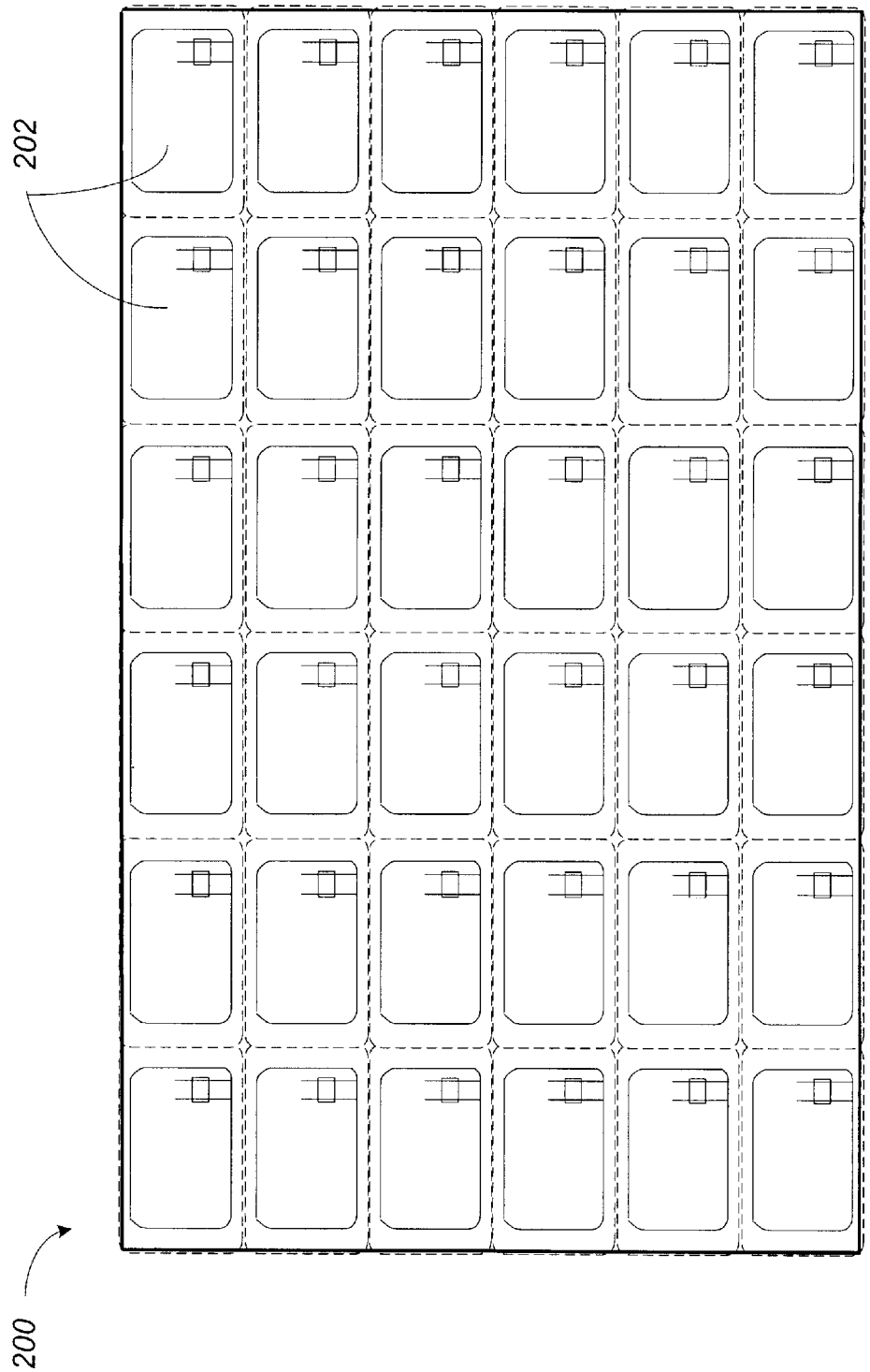
FIG. 2A is a plan view of a sheet including a number of card modules according to an embodiment.
Figure 2B:
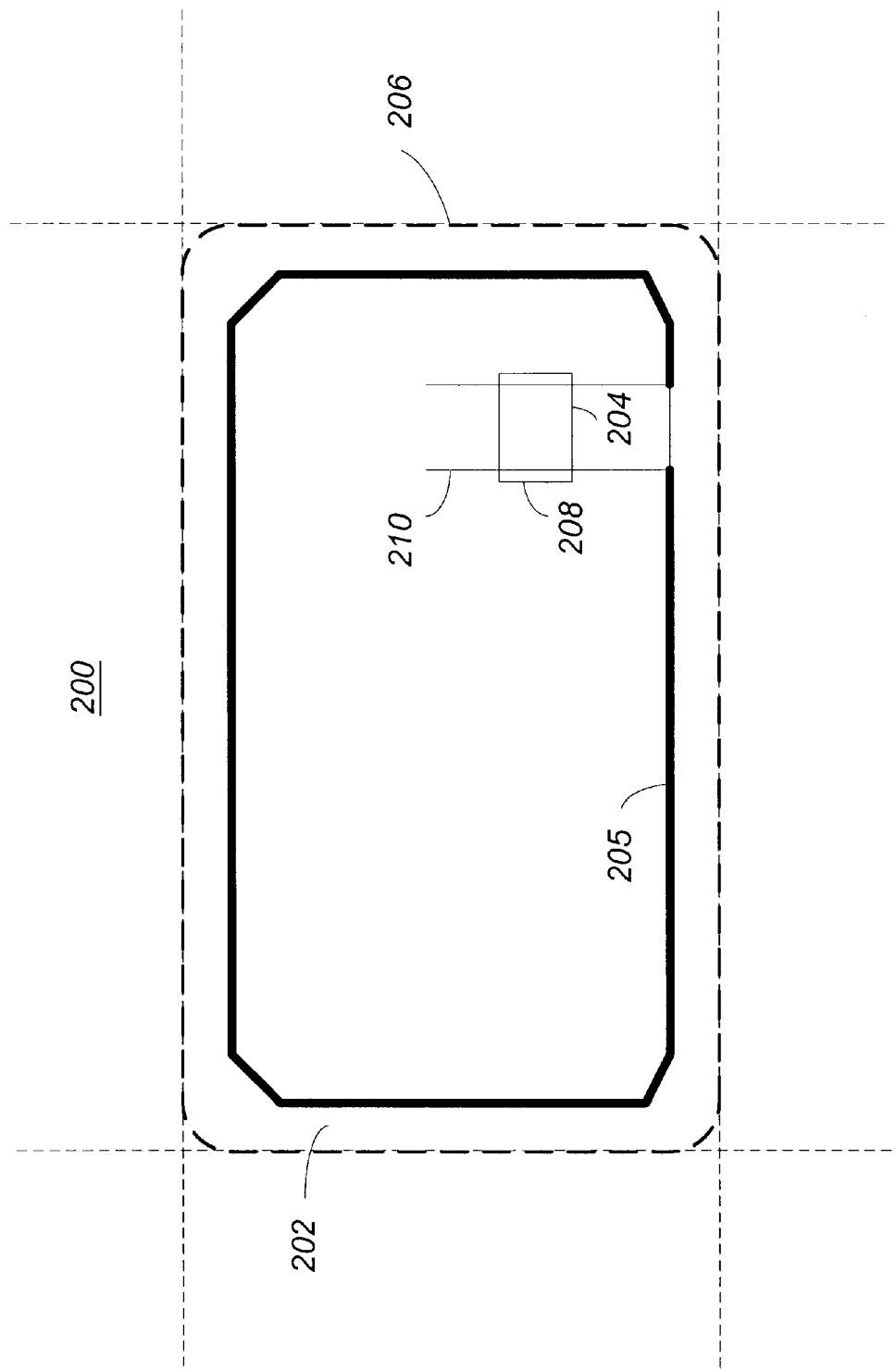
FIG. 2B is an expanded view of one of the card modules of FIG. 2A.

A batch of contactless smart cards may be manufactured simultaneously from a single sheet 200 of plastic, e.g., Polyvinyl Chloride (PVC) or Acrylonitrile Butadiene Styrene (ABS), as shown in FIGS. 2A and 2B. The plastic sheet 200 forms the substrate of the smart card modules 202 that are subsequently cut from the sheet 200. Cavities are punched in the sheet in locations corresponding to the IC modules for each card in the sheet. The IC modules 204 are then placed in the cavities and secured in place with an adhesive.

After the sheet has been populated with IC modules, the card antennas 204 are installed. The card antenna may be embedded using a staking technique, in which an insulated wire is heated and pressed into the plastic card substrate by a wiring horn, through which the wire is fed. The heated wired liquefies the plastic the wire contacts. The liquefied plastic mechanically captures the wire as it is pressed into the substrate. A robotic system may move an implanting head, including the wiring horn and a wire feeder/cutter, such that the heated wire is continuously fed from the wiring horn and embedded into the plastic card substrate as the implanting head is moved in a desired antenna pattern. The wire, which may be a polyester insulated copper wire about 4 mils in diameter, may be embedded into a card substrates having thicknesses between about 0.1 mm to 0.3, and comprising different types of plastic, e.g., PC, PVC, ABS, PET, or PETG.

Figure 3:
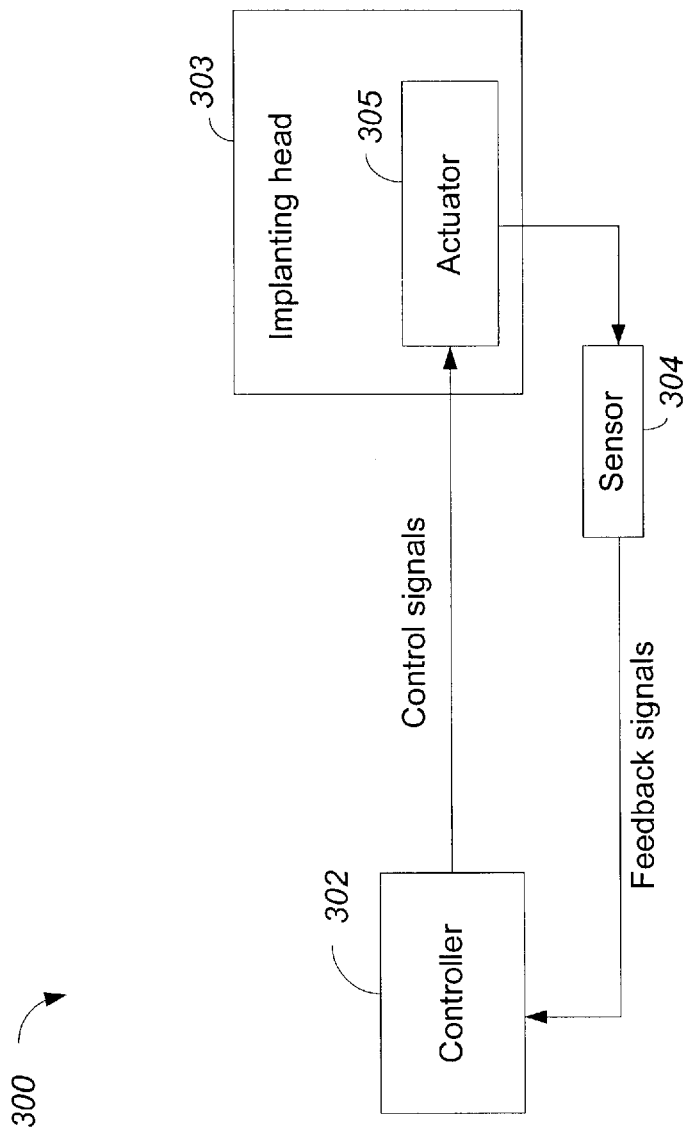
FIG. 3 is a block diagram of a wire implanting system according to an embodiment.

FIG. 3 illustrates a wire embedding system 300 according to an embodiment. A controller 302 sends electrical control signals to the implanting head 303 to control the pressure applied by the wiring horn to the card substrate while embedding the wire. The implanting head may include a pressure sensor 304, which sends electrical signals to the controller indicative of the pressure actually being applied to the card substrate by the implanting head.

Since the plastic card substrate and/or underlying work cell platen may not be perfectly flat, it may be necessary to adjust the amount of pressure applied by the implanting head while implanting an antenna. The controller 300 may use the signals fed back from the pressure sensor to adjust the pressure applied by the implanting head in a real-time manner such that the pressure is maintained at a desired pressure or in a desired pressure range. The efficacy of the above-described feedback system depends, in part, on the speed at which the implanting head can adjust the applied pressure in response to a control signal from the controller and the speed at which the pressure sensor can determine an instantaneous pressure being applied by the wiring horn.

The wire may be forced into the card substrate using a mechanical actuator, for example, a hydraulic or spring actuator. The pressure applied by implanting head may be controlled by using the mechanical actuator to maintain the wiring horn at a predetermined height. However, in such a system, the electrical signals issued by the controller in order to adjust the pressure height must be translated into mechanical motion by the mechanical actuator. Another problem with height control as a means for controlling pressure arises when there are surface variations in the card. For example, the substrate may be thinner in some regions than others, e.g., variations from 0.5 mm to 1 mm. In such instances, the wiring horn may punch through the substrate, plowing holes into the plastic substrate as the implanting head is moved in the antenna pattern. Also, the pressure sensor may use mechanical means to determine the pressure, e.g., by measuring the relative position between a component connected to the wiring horn and a stationary component. These mechanical measurements must be translated into electrical signals and then fed back to the controller. The electrical/mechanical translations take time and may introduce a significant degree of lag into the feedback system, which can decrease the performance of the system and quality of the embedded antennas.

Figure 4:
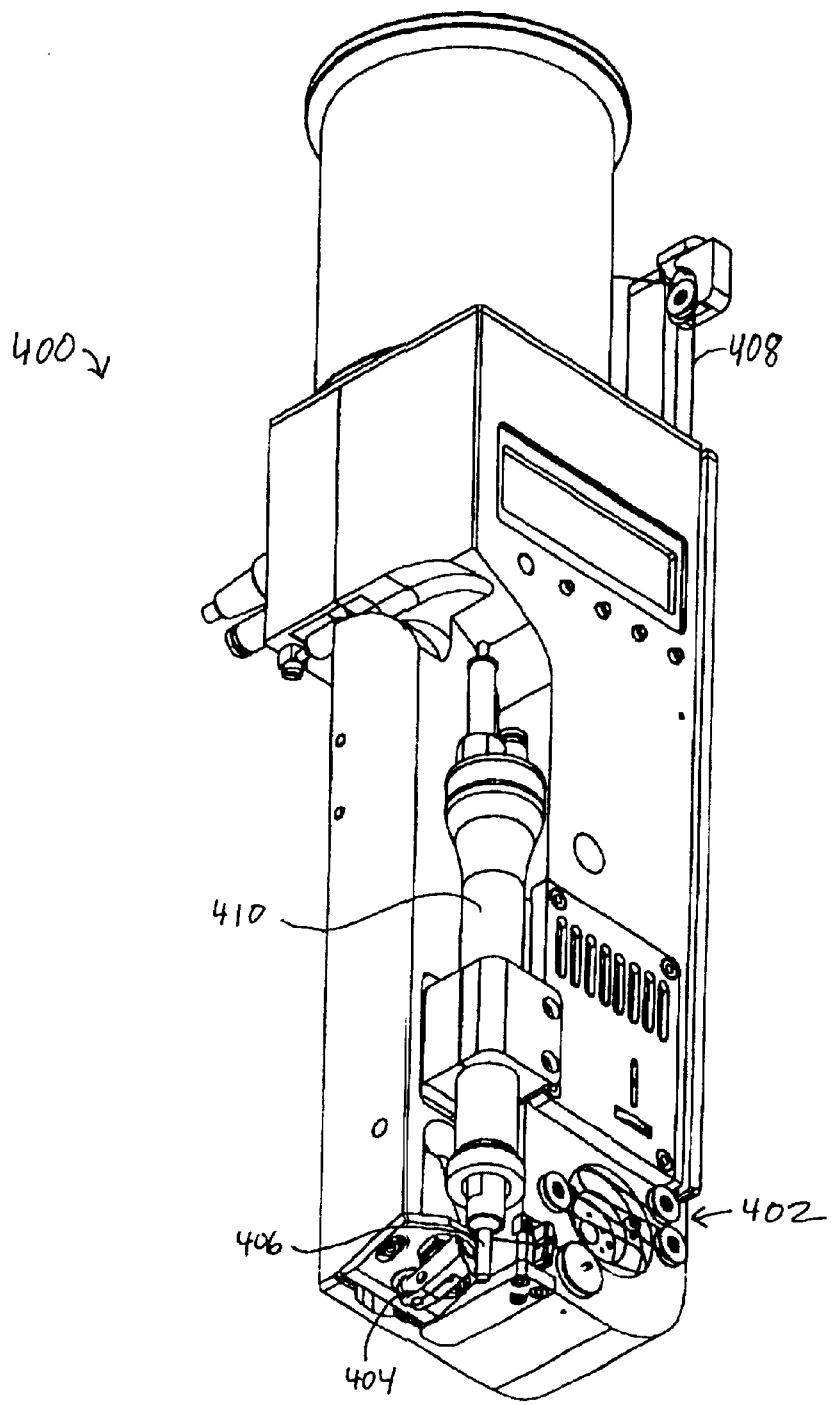
FIG. 4 is a perspective view of a voice-coil actuated implanting head according to an embodiment.

In an embodiment, an electrically-controlled actuator 305 is used to adjust the pressure rather than a mechanical actuator in order to decrease the lag created by electrical/mechanical translations. FIG. 4 shows a voice-coil controlled ultrasonic implanting head 400 according to an embodiment. The implanting head includes a wire feeder 402 and cutter 404, a wiring horn 406 through which the wire 408 is fed, and a voice-coil linear actuator 410 which controls the pressure at which the wiring horn is forced into the card substrate. The wiring horn 406 may be vibrated by a piezoelectric transducer at an ultrasonic frequency, e.g., on the order of 70 kHz. The ultrasonic vibration is translated into frictional heat which heats the wire 404 being fed through the horn.

Figure 5:
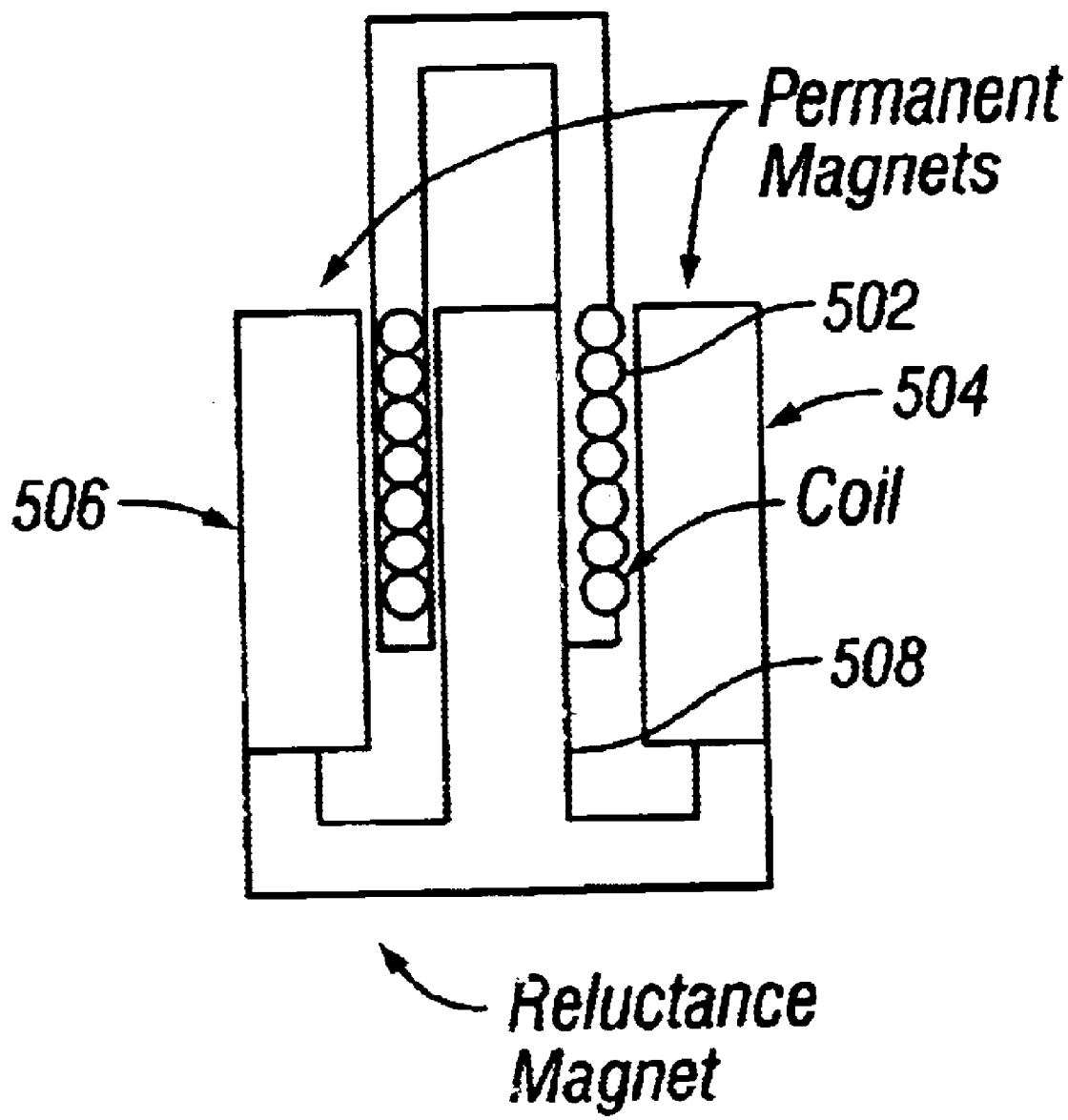
FIG. 5 is a sectional diagram of a voice-coil actuator according to an embodiment.

FIG. 5 shows the internal structure of the voice-coil actuator 410. The voice coil actuator utilizes a permanent magnet field and coil winding (conductor) to produce a force proportional to the current applied to the coil. A tubular coil of wire 502 situated within a radially oriented magnetic field. The field is produced by permanent magnets 504 embedded on the inside diameter of a ferromagnetic cylinder 506, arranged so that the magnets 504 "facing" the coil 502 are all of the same polarity. An inner core 504 of ferromagnetic material set along the axial centerline of the coil, joined at one end to the permanent magnet assembly, is used to complete the magnetic circuit. The force generated axially upon the coil when current flows through the coil produces relative motion between the field assembly and the coil.

The electrical control signals issued by the controller 300 can be directly translated into control current applied to the coil 502. This precise force control enables the voice-coil implanting head to compensate for even minute variations in flatness and thickness of the working substrate and underlying work cell platen. Because the force is proportional to the current applied, very accurate force control can be achieved without the degree of lag introduced by electrical/mechanical translation in a mechanical system. Also, the current in the coil changes as the applied pressure changes, for example, due to a bump, warp, or other surface variation. The pressure sensor, which may be incorporated into the actuator or the controller, can monitor changes in pressure electrically by monitoring changes in current and send this information to the controller. This enables very accurate pressure sensing without the degree of lag introduced by mechanical/electrical translation in a mechanical system. The combination of precise pressure control and accurate pressure sensing enables the system to better maintain a constant pressure during an implanting operation and to react faster than a mechanical system would.

The controller 300 can be programmed to set a different pressure for card substrates having different thicknesses and/or comprised of different types of plastic, e.g., PC, PVC, ABS, PET, or PETG.

After the wire antenna is embedded, the ends 210 of the wire antennas 205 are bonded to the IC module 204 to provide electrical interconnection between the IC module and the antenna in each card module. When the interconnects in all of the card modules 202 on the sheet 200 are satisfactory, the sheet 200 may be passed on for lamination. Once laminated, the sheet 200 may be cut into the individual smart cards.

The operations performed by the system and its components may be implemented in hardware or software, or a combination of both (e.g., programmable logic arrays). Unless otherwise specified, the algorithms included as part of the operation are not inherently related to any particular computer or other apparatus. In particular, various general purpose machines may be used with programs written in accordance with the teachings herein, or it may be more convenient to construct more specialized apparatus to perform the required method steps. However, preferably, the invention is implemented in one or more computer programs executing on programmable systems each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each such program may be implemented in any desired computer language (including machine, assembly, high level procedural, or object oriented programming languages) to communicate with a computer system. In any case, the language may be a compiled or interpreted language.

Each such computer program is preferably stored on a storage media or device (e.g., ROM, CD-ROM, or magnetic or optical media) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

A number of embodiments have been described. Nevertheless, it will be understood that various modifications may be made without departing from the spirit and scope of the invention. Accordingly, other embodiments are within the scope of the following claims.

What is claimed is:

1. A method comprising:
    applying pressure between a wire and a smart card substrate with an electromagnetic actuator; and
    staking the wire in an antenna in the smart card substrate.

2. The method of claim 1, wherein the electromagnetic actuator comprises a voice-coil actuator.

3. The method of claim 1, further comprising:
    monitoring the current in a conductive coil in the actuator; and
    changing the current in the coil in response to the monitored current.

4. The method of claim 3, wherein said changing the current comprises maintaining the pressure within a desired range.

5. The method of claim 4, further comprising:
    increasing the current in the coil to increase the pressure applied by the actuator; and
    decreasing the current in the coil to decrease the pressure applied by the actuator.

6. A wire implanting apparatus comprising:
    a wire horn;
    a wire feeder operative to feed a wire through the wire horn;
    a heating element operative to heat the wire; and
    an electromagnetic actuator operative to force the wire horn into a plastic card substrate.

7. The apparatus of claim 6, wherein the electromagnetic actuator comprises:
    a housing comprising a permanent magnet;
    an inner core slidably mounted in the housing and comprising a ferromagnetic material; and
    a tubular coil of a conductive material wound around the inner core and operative to receive an electrical current.

8. The apparatus of claim 6, wherein the heating element comprises an ultrasonic transducer.

9. A wire antenna implanting system comprising:
    a wire implanting apparatus including
        a wire horn,
        a wire feeder operative to feed a wire through the wire horn,
        a heating element operative to heat the wire, and
        an electromagnetic actuator operative to force the wire horn into a plastic card substrate; and
    a controller operative to monitor the current in the coil and to change the current in the coil in response to the monitored current.

10. The system of claim 9, wherein the electromagnetic actuator comprises:
    a housing comprising a permanent magnet;
    an inner core slidably mounted in the housing and comprising a ferromagnetic material; and
    a tubular coil of a conductive material wound around the inner core and operative to receive an electrical current.

11. The system of claim 9, further comprising a robotic system connected to the wire implanting apparatus and operative to move said apparatus in a desired antenna pattern.

12. The system of claim 9, wherein the controller is operative to:
    control the actuator to increase the current in the coil to increase the pressure applied by the actuator; and
    decrease the current in the coil to decrease the pressure applied by the actuator.

13. The system of claim 9, wherein the controller is further operative to change the current in the coil in order to maintain a desired pressure applied by the actuator.

14. An article comprising a machine-readable medium including machine-executable instructions, the instructions operative to cause the machine to:
    apply pressure between a wire and a smart card substrate with an electromagnetic actuator; and
    stake the wire in an antenna in the smart card substrate.

15. The article of claim 14, wherein the electromagnetically controlled actuator comprises a voice-coil actuator.

16. The article of claim 14, further comprising instruction operative to cause the machine to:
    monitor the current in a conductive coil in the actuator; and
    change the current in the coil in response to the monitored current.

17. The article of claim 16, wherein the instructions causing the machine to change the current comprise instructions causing the machine to maintain the pressure within a desired range.

18. The article of claim 17, further comprising instructions operative to cause the machine to:
    increasing the current in the coil to increase the pressure applied by the actuator; and
    decreasing the current in the coil to decrease the pressure applied by the actuator.

* * * * *